US009242842B2

(12) United States Patent
Klenk

(10) Patent No.: US 9,242,842 B2
(45) Date of Patent: Jan. 26, 2016

(54) DEVICE FOR PRODUCING CONTAINERS FOR LIQUID

(75) Inventor: Christoph Klenk, Wenzenbach (DE)

(73) Assignee: KRONES AG (DE)

( * ) Notice: Subject to any disclaimer, the term of this patent is extended or adjusted under 35 U.S.C. 154(b) by 804 days.

(21) Appl. No.: 13/395,377

(22) PCT Filed: Sep. 9, 2010

(86) PCT No.: PCT/EP2010/063202
§ 371 (c)(1),
(2), (4) Date: Apr. 3, 2012

(87) PCT Pub. No.: WO2011/029856
PCT Pub. Date: Mar. 17, 2011

(65) Prior Publication Data
US 2012/0180439 A1    Jul. 19, 2012

(30) Foreign Application Priority Data
Sep. 14, 2009  (DE) .......................... 10 2009 041 160

(51) Int. Cl.
*B65B 3/02*     (2006.01)
*B67C 7/00*    (2006.01)
(Continued)

(52) U.S. Cl.
CPC ............ *B67C 7/0053* (2013.01); *B65G 47/847* (2013.01); *B67C 7/002* (2013.01); *B65G 2207/08* (2013.01); *B67C 2003/227* (2013.01); *Y10T 29/49826* (2015.01)

(58) Field of Classification Search
CPC   B67C 2003/227; B67C 7/0073; B67C 3/242; B67C 7/00; B67C 7/0053; B67C 2003/228; B29C 49/06; B29C 49/04; B65B 3/022; B65B 59/04

USPC ........ 53/558, 559, 561, 266.1, 267, 268, 285; 198/860.2
See application file for complete search history.

(56) References Cited

U.S. PATENT DOCUMENTS

| 5,607,045 A | 3/1997 | Hermann Kronseder . 198/476.4 |
| 5,778,633 A * | 7/1998 | Sweeny .......................... 53/201 |

(Continued)

FOREIGN PATENT DOCUMENTS

| CN | 1134908 | 11/1996 | ............. B65G 47/86 |
| CN | 101513769 | 8/2009 | ............. B29C 49/28 |

(Continued)

OTHER PUBLICATIONS

Chinese Notification of 1st Office Action, English text, Appln. No. 201080040712.6, mailing date Jun. 16, 2014 (1 pg).

(Continued)

*Primary Examiner* — Stephen F Gerrity
*Assistant Examiner* — Eyamindae Jallow
(74) *Attorney, Agent, or Firm* — Hayes Soloway P.C.

(57) ABSTRACT

A device for producing containers for liquid includes a shaping unit for shaping plastic preforms into plastic containers and a filling unit for filling the plastic containers with a liquid medium. At least one transporting device, which is used as an interface, lies between a discharging region of the shaping unit and a feeding region of the filling unit, the transporting device transporting plastic containers at least along some sections and individually between the shaping unit and the filling unit. The transporting device is designed such that at least one further process unit can be inserted between the shaping unit and the filling unit.

24 Claims, 3 Drawing Sheets

(51) Int. Cl.
*B65G 47/86* (2006.01)
*B67C 3/22* (2006.01)

(56) References Cited

U.S. PATENT DOCUMENTS

| | | | |
|---|---|---|---|
| 5,893,700 A | 4/1999 | Kronseder | 414/744.2 |
| 5,996,322 A * | 12/1999 | La Barre | 53/561 |
| 6,047,525 A * | 4/2000 | Kieras et al. | 53/411 |
| 6,119,433 A * | 9/2000 | Kitahora et al. | 53/167 |
| 6,298,638 B1 * | 10/2001 | Bettle | 53/452 |
| 6,332,484 B1 * | 12/2001 | Stahlecker et al. | 141/129 |
| 8,234,839 B2 * | 8/2012 | Miller et al. | 53/410 |
| 2004/0129540 A1 * | 7/2004 | Brixius et al. | 198/860.2 |
| 2004/0187444 A1 * | 9/2004 | Hutchinson et al. | 53/453 |
| 2006/0032189 A1 * | 2/2006 | Giacobbe | 53/426 |
| 2009/0013647 A1 * | 1/2009 | Mastio et al. | 53/425 |
| 2009/0071104 A1 * | 3/2009 | Fischer | 53/426 |
| 2009/0077933 A1 * | 3/2009 | Backhaus et al. | 53/561 |
| 2009/0126323 A1 * | 5/2009 | Kelley et al. | 53/561 |
| 2009/0173039 A1 * | 7/2009 | Slomski et al. | 53/167 |
| 2009/0205746 A1 * | 8/2009 | Yousefpour et al. | 141/92 |
| 2009/0208601 A1 | 8/2009 | Shimomura | 425/150 |
| 2010/0324723 A1 | 12/2010 | Zech | 700/223 |
| 2011/0061343 A1 * | 3/2011 | Roithmeier et al. | 53/452 |
| 2011/0061347 A1 * | 3/2011 | Stoiber et al. | 53/558 |
| 2011/0265433 A1 * | 11/2011 | Chauvin et al. | 53/558 |
| 2011/0302881 A1 * | 12/2011 | Van Steen | 53/127 |
| 2012/0151883 A1 * | 6/2012 | Klarl et al. | 53/558 |
| 2012/0266567 A1 * | 10/2012 | Haesendonckx et al. | 53/456 |
| 2013/0125509 A1 * | 5/2013 | Sowislo et al. | 53/396 |

FOREIGN PATENT DOCUMENTS

| | | | |
|---|---|---|---|
| DE | 3517074 A * | 11/1986 | |
| DE | 202005002470 | 11/2005 | B65B 59/04 |
| DE | 202007017932 | 10/2008 | B67C 7/00 |
| DE | 102008008528 | 8/2009 | B65B 57/02 |
| EP | 1714939 | 10/2006 | B67C 3/22 |
| JP | 2006-111295 | 4/2006 | B65B 55/10 |
| JP | 2008-062955 | 3/2008 | B65B 43/42 |
| JP | 2009-190784 | 8/2009 | B65D 57/00 |
| WO | WO 9822374 | 5/1998 | B65G 47/02 |
| WO | WO 9847770 | 10/1998 | B65B 47/08 |
| WO | WO 2005/092597 | 10/2005 | B29C 65/80 |
| WO | WO2009101087 | 8/2009 | B67C 3/00 |

OTHER PUBLICATIONS

Notification of Reason for Rejection issued in corresponding Japanese Patent Appln. No. 2012-528353 dated Feb. 26, 2014, English translation (4 pgs).

International Search Report issued in corresponding PCT Application No. PCT/EP2010/063202 dated Dec. 7, 2011. (15 pgs).

Chinese Notification of $2^{nd}$ Office Action, English text only, Appln. No. 201080040712.6, mailing date Jul. 9, 2015 (16 pgs).

* cited by examiner

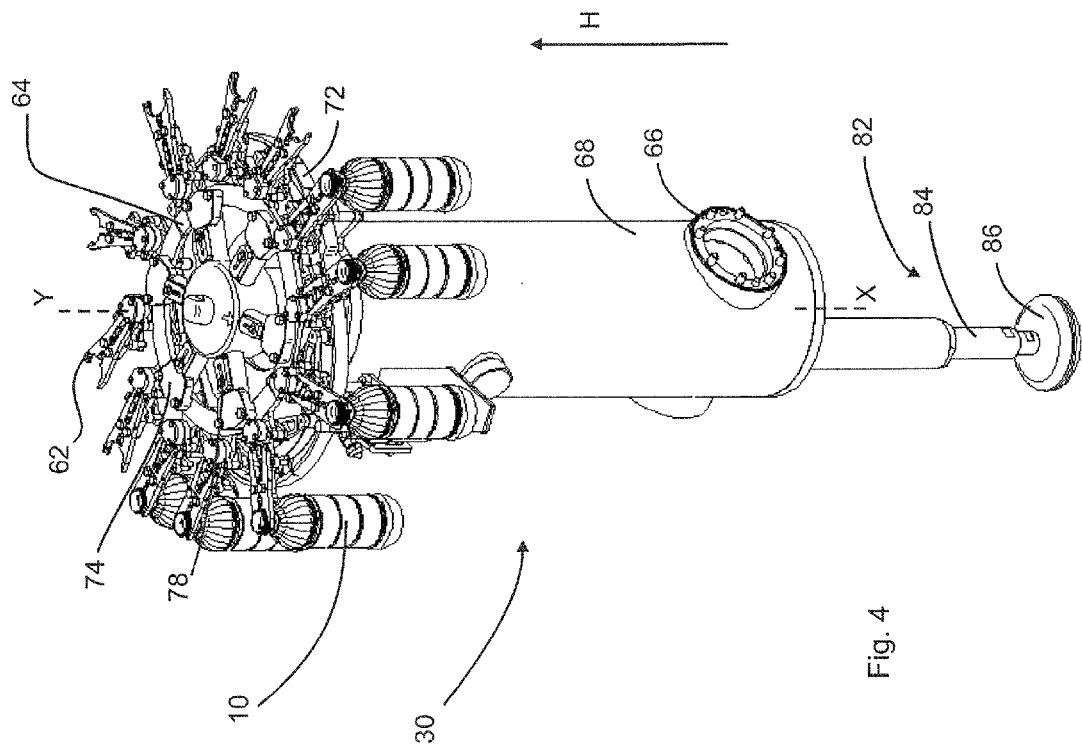
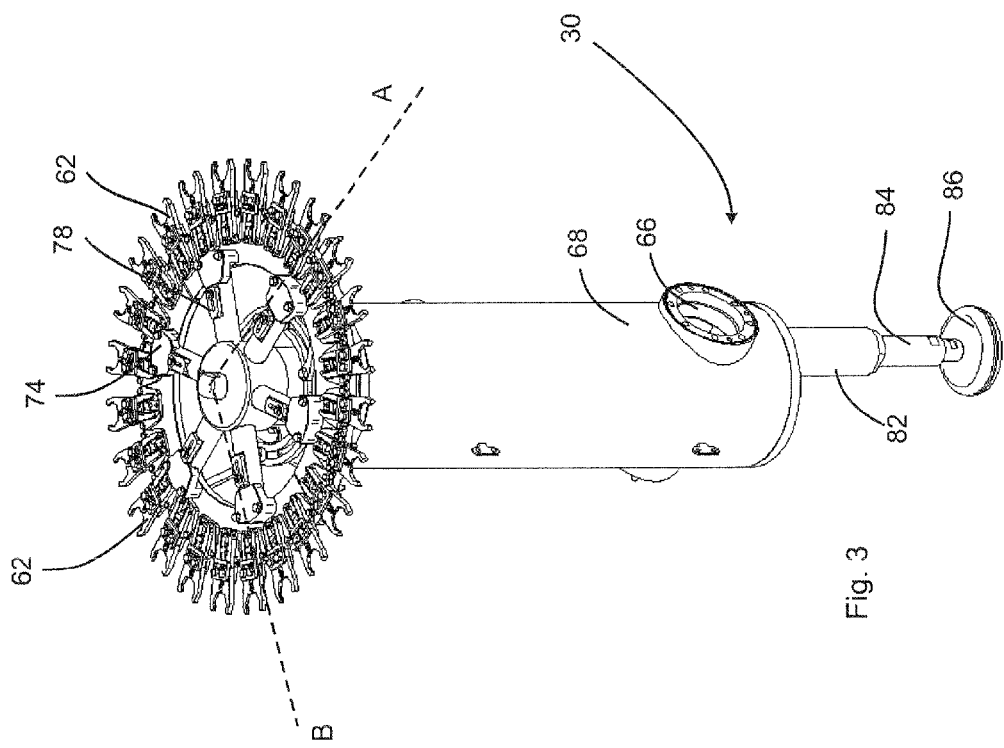

DEVICE FOR PRODUCING CONTAINERS FOR LIQUID

BACKGROUND OF THE INVENTION

The present invention relates to an apparatus for the production of containers for liquid. Apparatus of this type have long been known from the prior art. In this case it is known in particular for containers, such as for example plastics material containers, during a production procedure first to be produced in a shaping procedure and then to be filled with a beverage. Apart from these basic facts, however, production plants of this type for containers for beverages are extremely varied. In this way, different beverages, for example mineral waters or juices, require very different degrees of purity or levels of sterilization. In addition, the nature of the labelling of containers is very different and can be carried out for example by the application of self-adhesive labels or by the application of labels by means of gluing. Furthermore, the most widely varying methods are also known in order to sterilize the containers themselves. For this reason, apparatus of this type should always be regarded as special machines which thus require a very high production outlay.

The object of the present invention is therefore to provide an apparatus which can be adapted with a comparatively low outlay to widely differing situations, such as for example widely differing situations of space or even different conceptual designs.

A further object of the present invention is to provide a method by which it is possible to set up, on the basis of specific information, for example customer information, a suitable plant.

SUMMARY OF THE INVENTION

An apparatus according to the invention for the production of containers for liquid has a shaping unit, in order to shape plastics material pre-forms into plastics material containers. Furthermore, a filling unit for filling the plastics material containers with a liquid medium, and in particular with a beverage, is provided, the filling units being arranged downstream with respect to the shaping unit in a conveying direction of the plastics material containers and the shaping unit having a supply region for supplying the plastics material pre-forms as well as a discharge region in order to discharge the shaped plastics material containers out of the shaping unit. Furthermore, the filling unit has a supply region for supplying the plastics material containers to the filling unit as well as a discharge region for discharging the plastics material containers filled with a liquid out of the filling unit.

According to the invention at least one conveying device, which acts as an interface and which conveys the plastics material containers—preferably in a conveying flow—at least locally and in an individual manner between the shaping unit and the filling unit, is situated between the discharge region of the shaping unit and the supply region of the filling unit, the conveying device being designed in such a way that at least one further unit for handling the containers is capable of being inserted into the apparatus between the shaping unit and the filling unit, and this further unit being capable of being attached to the conveying device in such a way that the conveying flow between the shaping unit and the filling unit runs by way of the further unit, i.e. the containers are also gripped and conveyed at least for a time by gripping elements which are associated with this further unit. In this way, handling of the containers by the further unit is made possible.

A modular design of the apparatus according to the invention is thus proposed, in which a conveying device between the shaping unit and the filling unit acts at the same time as an interface for essentially any further appliances, such as for example sterilization units. This conveying device is thus preferably able not only to pass on the containers from the shaping unit to the filling unit, but also to effect a synchronization between the shaping unit and the filling unit.

It is advantageous for the apparatus to have a plurality of conveying devices of the type described above, in which case these conveying devices are designed in a substantially similar manner. In this way, a modular design of the entire plant with a plurality of parts is possible. In this case it is possible for the conveying devices to be designed in an identical manner, but it would also be possible for them to differ with respect to features, such as the pitch circle radius of a conveying path for the containers.

It is preferable for the apparatus to have a control device for controlling the shaping unit and the filling unit. In this case the aforesaid conveying device can also be integrated into a control by this control device.

In the case of a further advantageous embodiment the conveying device has a drive device as well as preferably also a control input which is capable of being connected to a control output of the aforesaid control device in order to integrate the conveying device into the apparatus as a whole. In this way, expressed more precisely, the conveying device or the drive thereof is capable of being integrated into the entire control. In principle it would also be possible for a so-called master shaft to be used as a common drive device, and for it in turn to operate the individual parts of the plant. It is preferable, however, for a control as described here to be provided. This separate drive device is in particular, but not exclusively, a servo motor. As a result of this arrangement the conveying device is capable of being decoupled from the other parts of the plant, and this in particular is also important in the event of failure or in the case of maintenance and servicing.

In the case of a further advantageous embodiment the conveying device has a plurality of gripping elements arranged on a carrier rotatable about a pre-set axis of rotation in order to grip the containers, these gripping elements being capable of being controlled at least in part. In this case these gripping elements preferably grip the containers in a neck region or below a carrier ring provided for this. At least some of these gripping elements, but preferably all the gripping elements, are made active or controllable. It is also possible, however, for these gripping elements to be capable of being changed over from an active control to a passive control, i.e. for the individual gripping elements to be able to act in both an active and a passive manner. As a result of this procedure, the conveying device is capable of being applied to different types of plant and it can be used in accordance with requirements.

In the case of a further advantageous embodiment the gripping elements are capable of being controlled in a manner dependent upon a rotational setting of the carrier with respect to the axis of rotation, in which case pre-set control positions are capable of being freely selected with respect to the rotational setting of the carrier. Expressed more precisely, with this embodiment it is possible to ascertain the angular settings in which for example a corresponding gripping element should open and those in which it should close. As a result of this ability of the angular positions to be freely selected, the possibilities of use for the corresponding gripping elements are likewise increased. In this way, for example, an opening and closing of the respective gripping element at any desired angle is possible. It is preferable for the opening and closing of the gripping element to be carried out by an electrical drive.

It is preferable for the drive device to be variable in its division, i.e. it can also be used under widely varying geometrical conditions.

It is thus preferred for the containers to be advanced by the gripping elements on a pre-set circular path, in which case the conveying device also allows a radius of curvature of this circular path to be set. This can be carried out for example in that a pivoting setting of the gripping elements is variable with respect to the carrier or even in that the individual gripping elements are able to be extended or retracted in a radial direction.

In the case of a further advantageous embodiment a conveying device is arranged in each case at the supply region and the discharge region of the shaping unit as well as at the supply region and the discharge region of the filling unit, these conveying devices being designed in a similar manner in each case. A similar design in this case is understood on the one hand as being that they are designed in a completely identical manner, while on the other hand conveying devices in which conveyor tracks with different radii are capable of being produced in each case are also understood as being "similar".

In the case of a further advantageous embodiment at least one sterilization unit for sterilizing the containers by means of at least two similar conveying devices is integrated between the shaping unit and the filling unit. This sterilization unit can preferably be a sterilization unit which sterilizes the containers by means of an electron beam (e-beam). In this way, the sterilization unit does not directly adjoin the shaping unit or the filling unit, but one conveying device is present between these units in each case.

In the case of a further advantageous embodiment the conveying device has a separate conveying path for conveying the containers. This means that the conveying path on which the containers are conveyed by the conveying device is not integrated into other conveying paths. In this way for example no continuous conveying chain which connects the shaping unit to the filling unit is provided in this case, but the conveying path is interrupted by a separate conveying path of the conveying device. It is preferable for the other apparatus too, such as for example the filling unit and the shaping unit to have separate conveying paths in each case. As a result of this procedure the apparatus can be adapted to widely differing situations. It is preferable for the conveying device, as mentioned above, to be a conveying star wheel.

In the case of a further advantageous embodiment the apparatus is capable of being assembled with any desired handling units for handling containers whilst using substantially similar conveying devices of the type described above. In this way it is possible for a conveying flow of the containers to be interrupted at substantially any desired locations in order for example to introduce further units or to remove units from the apparatus in accordance with requirements. In this way it is preferable for each handling unit of the apparatus to have a separate conveying path for the containers.

In the case of a further advantageous embodiment a labelling device for labelling plastics material containers is capable of being integrated into the apparatus.

In addition, however, other plants, such as further sterilization units, washing units for the containers and the like, can also be integrated.

In the case of a further advantageous embodiment a conveying device for conveying the containers is arranged in at least one supply region or at least one discharge region. This further conveying device can be for example a conveyor belt or the like.

The present invention further relates to a conveying device, in particular for an apparatus of the type described above, which has a plurality of gripping elements arranged on a carrier rotatable about a pre-set axis of rotation in order to grip the containers, these gripping elements being capable of being controlled at least in part. Furthermore, a drive device for rotating the carrier is provided and preferably also a control device for controlling the aforesaid drive device.

According to the invention the gripping elements are capable of being controlled in a manner dependent upon a rotational setting of the carrier with respect to an axis of rotation, in which case pre-set control positions are capable of being freely selected with respect to the rotational setting of the carrier. As mentioned above, it is also possible in this case to select the angular positions in which a specified gripping element should be closed or opened and those by way of which a gripping element should be kept closed or opened. The control device preferably has a control input, with the aid of which it can be integrated into an overriding machine control.

The present invention additionally relates to a method of assembling an apparatus of the type described above. In this case a specific product requirement is submitted in a first method step, and, after that, the necessary components are determined for these specific product requirements and information which is characteristic of the necessary components is issued to a user, this information being ascertained on the basis of the product requirement. The specific product requirement can be for example the category of a beverage to be poured in or a specific degree of sterilization.

The aforesaid product requirement thus preferably contains at least one parameter which is characteristic of a degree of purity in the interior of the containers to be produced. In this way, information as to which units must necessarily be used, which units are optional and which alternative units are likewise capable of being used can be issued for example to the user. Furthermore, it is possible to indicate which conveying devices and optionally how many conveying devices of the type mentioned above have been used. The aforesaid product requirements can, as mentioned above, be the category of a beverage to be poured in or even, for example, the nature of an outer wall of the containers, for example the thickness thereof or even further properties. Furthermore, the product requirements can also be spatial circumstances for a corresponding apparatus.

BRIEF DESCRIPTION OF THE DRAWINGS

Further embodiments and advantages are evident from the accompanying drawings. In the drawings

FIG. 3 shows a first embodiment of a conveying device according to the invention, and FIG. 4 shows a further embodiment of a conveying device according to the invention.

DETAILED DESCRIPTION OF THE INVENTION

Figure 1:
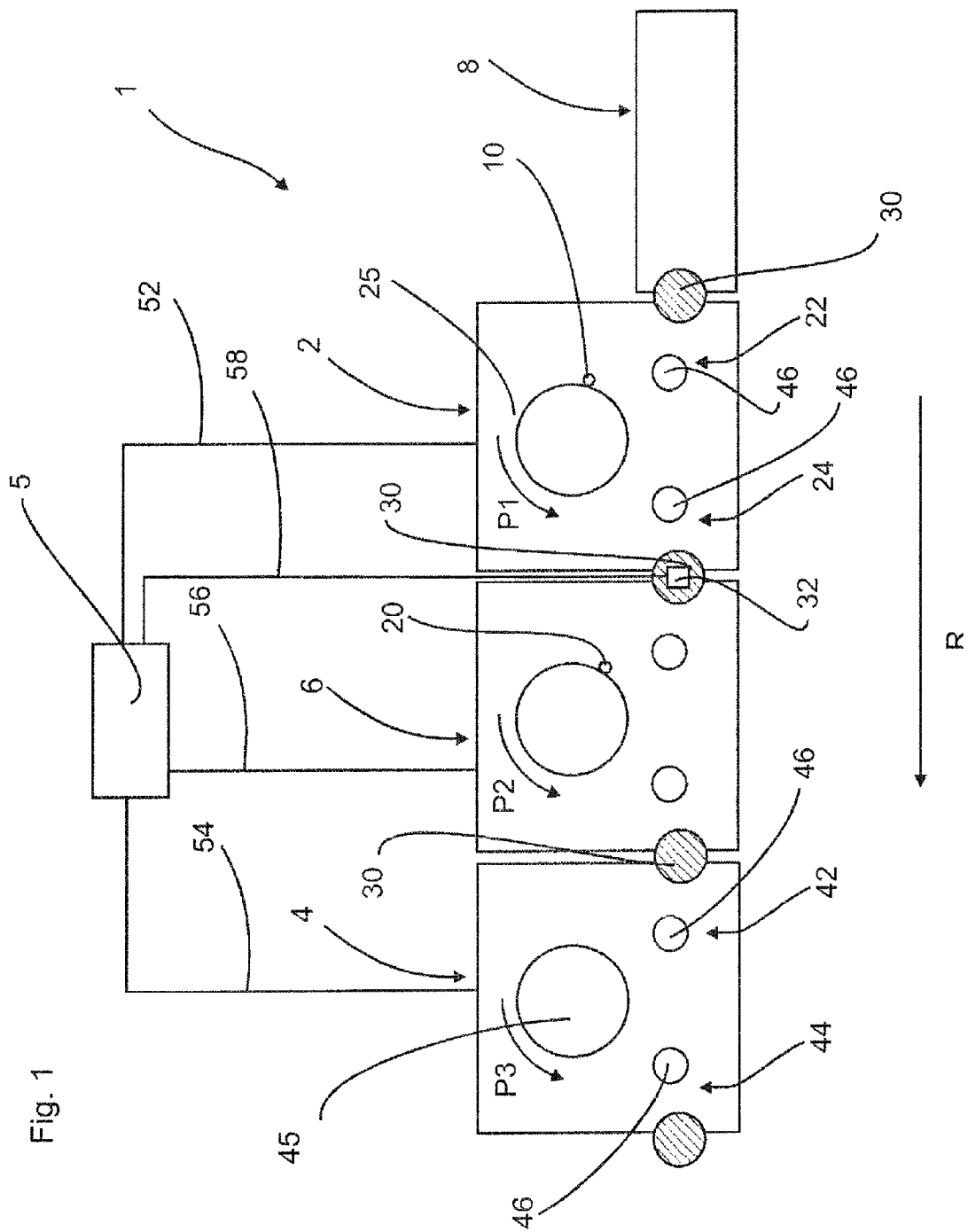
FIG. 1 shows an apparatus according to the invention in a first embodiment.

FIG. 1 shows an apparatus according to the invention in a first embodiment. This apparatus 1 has a shaping unit 2 which shapes the pre-forms 10 into containers 20. It is preferably a stretch blow moulding machine which shapes the pre-forms into containers by acting upon them with compressed air. A heating unit for the pre-forms, such as for example a furnace 8, is situated in front of this shaping unit, i.e. in this case upstream in the conveying direction R. This shaping unit 2 is adjoined by a sterilization unit 6, with the aid of which the now shaped containers 20 are sterilized. In particular, an internal sterilization of the containers 20 is carried out in this case. For this purpose, the sterilization unit 6 can have for example beam fingers or the like, which dip into the containers 20 and sterilize the inner wall thereof in this way. This sterilization unit 6 is adjoined by a filling unit 4 in which the now sterilized containers are filled with a liquid, such as for example a beverage.

In this case the shaping unit 2 has both a supply region 22 for the pre-forms and a discharge region 24 for the containers. In these supply regions and discharge regions conveying elements 46 can be provided which supply the respective containers to a central carrier wheel 25. In a corresponding manner, the filling unit also has a supply region 42 and a discharge region 44 for the supply and discharge respectively of the now filled containers.

Conveying elements 46 and a carrier wheel 45 can in turn also be provided in these regions. In this case it should be noted that both the shaping unit 2 and the filling unit 4 have in each case a plurality of gripping elements for the containers, in which case for example these gripping elements are arranged on the carrier wheel 25 and thus move on a continuous circular path (along the arrow P1). The gripping elements of the filling unit 4 are also arranged on a carrier wheel 45 in a corresponding manner and thus likewise move on a continuous circular path (arrow P2).

A significant aspect of the present invention is this separation of the individual gripping elements of the different parts of the plant. In this way, a continuous conveying chain which moves the containers from one unit to the next is not used, as is customary in the prior art but each unit has its own separate gripping elements for the containers. In this way, each gripping element remains in the region of that part of the plant with which it is associated. Both the mechanical and the control connections between the conveying devices 30 and the other parts of the plant, such as the filling unit and the shaping unit, are capable of being separated with comparatively little outlay.

Conveying devices 30 according to the invention are arranged in each case between the shaping unit 2, the sterilization unit 6 and the filling unit 4. The containers are conveyed from one unit to the next unit in each case by means of these conveying units 30 which likewise have a self-contained system of gripping clamps in each case. In this case these conveying units 30 are interchangeable, so that the most widely differing modules can be combined with one another by way of the respective conveying units 30. The individual conveying units 30 have in each case drive elements 32 in the form of servo motors.

The reference number 5 relates to a central control device for the plant as a whole. This control device is connected in each case in terms of communication 52, 54 and 56 to the shaping unit 2, the sterilization unit 6 and the filling unit 4. The aforesaid units or the drives thereof respectively are synchronized with one another by way of these communication connections. The central control device is also connected in terms of communication to the drive unit 32 of the conveying device 30 and (not shown) also to the drive units of the further conveying devices 30 by way of a further communication connection 58. In this way, it is also possible to integrate a plurality of conveying devices 30 into the entire control means, in which case the position of these conveying devices depends upon the circumstances of the plant as a whole. The reference letter R designates the conveying direction of the containers.

Figure 2:
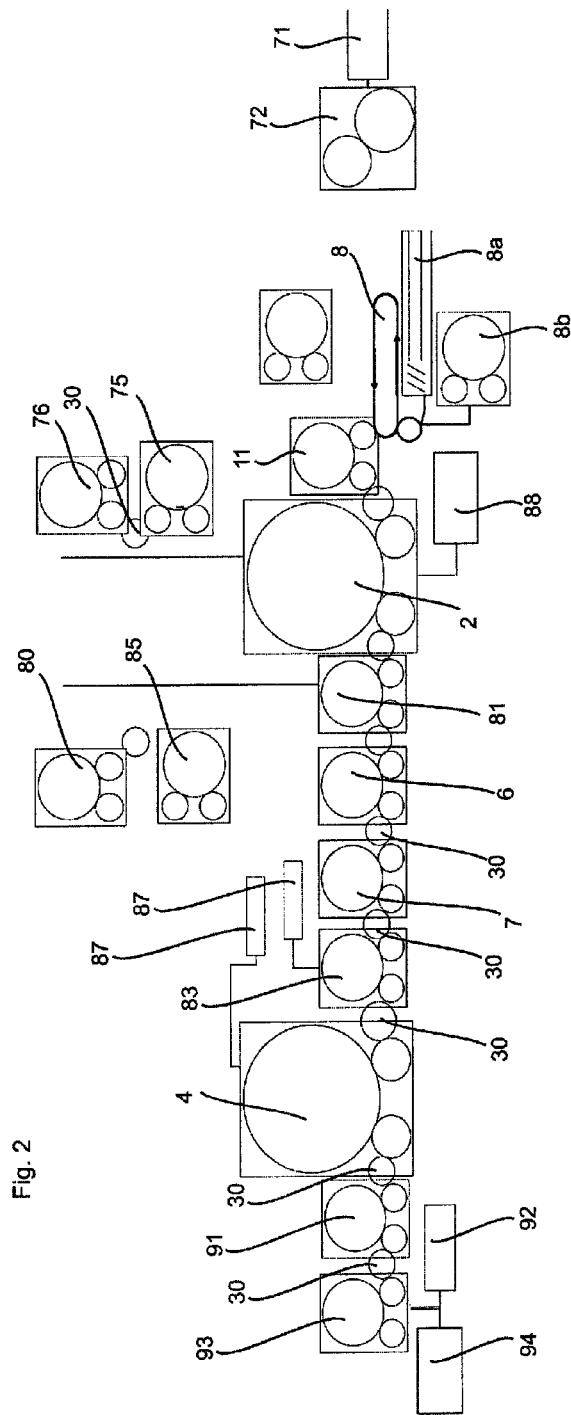
FIG. 2 is diagrammatic illustration of an apparatus according to the invention in order to illustrate possible parts of the plant.

FIG. 2 is an illustration to show possible combinations of the plants. In this case different parts of the plant are shown which can be used in machines of this type, the present invention allowing essentially any combination of these parts of the plant which is adapted to the purpose of application.

The reference number 71 relates to a production unit for producing pre-forms. In this case a plastics material supply unit 72 which supplies the plastics material to the production unit 71 is further provided. The plastics material pre-forms produced in this way can be supplied to a heating device 8. Instead of or in addition to the heating device 8, however, it is also possible for other heating devices to be used, such as for example a microwave oven 9, it also being possible for sterilization units for sterilizing the pre-forms to be used in a microwave oven 9 of this type. These sterilization units can be for example electron beam modules, UV modules or even sterilization units which sterilize by means of hydrogen peroxide. A pre-form supply unit in the form of a roller unit 8a or even in the form of a disc feed 8b can be provided on the furnace 8.

It is also possible for a further sterilization unit 11 of the type described above to adjoin the furnace 8. In this case this sterilization unit 11 can be attached directly to the furnace, but it would also be possible for the attachment to be effected by way of a conveying device 30. A robot unit 88 for an automatic mould change can be attached for example to the shaping unit 2 or the blow moulding module 2 respectively. In addition, a labelling unit 76 and/or a buffer unit 75 can also be attached to the shaping unit 2, in which case the attachment can also be effected with the aid of a conveying device according to the invention. The reference number 80 likewise relates to a labelling unit and the reference number 85 to a buffer unit. This means that a labelling of the container is possible at different times during the production process.

A coating unit 81 as well as the sterilization units 6 and 7 already mentioned can be integrated into the process downstream of the shaping unit 2. The reference number 83 relates to a metering unit to which valve nodes 87 can be attached. Valve nodes 87 of this type can also be attached to the filling unit 4. The reference numbers 6 and 7 designate further sterilization units.

An injection unit 91 for nitrogen for example as well as a closure unit 93 for closing the filled containers with closures 93 can be provided downstream with respect to the filling unit 4. This closure unit 93 can also have integrated sterilization units. The reference number 92 relates to a closure supply unit for container closures and the reference number 94 relates to a sterilization unit for the container closures.

It is thus evident that depending upon the technical requirements the most widely differing units can be combined with one another. On account of the conveying devices 30 provided between the units in each case it is possible for these units of the plant to be assembled as desired. In this case, as indicated in FIG. 2, the individual conveying devices 30 have pitch circle radii which are different in part or different tracks, along which the containers are conveyed. The conveying devices 30 are in this case capable of conveying both pre-forms and already shaped containers.

FIGS. 3 and 4 each show a conveying device 30 according to the invention in two different embodiments. In this case two conveying devices 30 have in each case a carrier or a carrier wheel 64 on which a plurality of gripping clamps 62 are arranged. It is possible in this case for the gripping clamps 62 to be pivotable about a pivot axis Y in the plane of this carrier wheel 64, so that the transfer of containers can be facilitated in this way or the radius of a conveyor track for the containers 10 is also capable of being changed.

In addition, as mentioned in the introduction, it is possible for the gripping elements 62 to be displaced in their entirety in the radial direction with respect to the carrier wheel 64. In this way, it is possible to change the radius of a conveyor track of the containers. The gripping clamps in this case are capable of being actuated electrically and preferably independently of one another. It is preferable for electrically actuated drive elements, such as in particular but not exclusively electric motors or electromagnets, to be provided in order to switch the gripping clamps between a closed state and an opened state. In this case, in contrast to the prior art it is preferable to provide not a cam in order to adjust the gripping elements, but individual drives for the individual gripping elements. It would also be possible, however, for an adjustable cam to be provided.

The reference number 74 relates to a fastening element for arranging the carrier wheel on a central drive 32. It is also possible, by way of an adjustment mechanism 78 for the individual gripping clamps to be displaced in the radial direction. The reference number 68 relates to a housing in which the drive device or a drive shaft for the conveying device 30 is arranged. The conveying device 30 can be attached by way of a connection point 66 to further elements, such as for example the shaping unit 2 or the filling unit 4. The reference number 82 designates in its entirety a stand which has an element 84 extensible in a telescopic manner as well as a base element or a base plate 86. In this case this telescopic element 84 is capable of being vertically adjusted, so that as a whole the entire conveying device or the gripping clamps 30 are capable of being altered in height H.

In general, it is preferable for a height of the gripping clamps 62 of the conveying device 30 to be capable of being altered, so that in this way too it is easier for an adaptation to different circumstances of the plant to be effected. The conveying device 30 can be integrated into a plant in terms of the control by way of control inputs and outputs respectively (not shown).

In the case of a preferred embodiment the carrier 64 is capable of being removed from the housing 68 by the gripping clamps 62. In this way, the same basic housing 68 can be used for all the conveying devices 30 and, depending upon requirements, different carriers (for example with different numbers of gripping elements or with different radii of the conveyor tracks) can be arranged on the housing 68. In this way, the number of the similar parts for a corresponding plant can be increased. In this case for example the drive device 32 can be situated in the housing and a unitary attachment means to which different carriers 64 can be connected (for example with different numbers of gripping clamps) can be provided in the housing.

A further embodiment of a conveying device 30 according to the invention is shown in FIG. 4. It is evident in this case that, as compared with the embodiment shown in FIG. 4a, a plurality of gripping devices or gripping clamps 62 are provided and, in addition, the radius of the conveyor track of these gripping devices 62 is larger than in the case of the embodiment shown in FIG. 4a. In this case the individual gripping clamps 62 are in each case controlled elements, i.e. each individual gripping clamp 62 can be controlled with respect to its opening and closing setting. It is further possible to select in this case the angle positions in which a specific gripping element 62 adjoins in working operation and the angle positions in which it opens.

In this way, it can be established for example that the gripping devices 62 close at the position A in the peripheral direction in order to grip a container in this way and open at the position B in the peripheral direction in order to deliver this container again. In addition, the conveying device permits a variable conveying speed of the gripping devices and the carrier 64 respectively. In this case the respective opening and closing positions can be pre-set by the central control device. Other opening and closing positions as well as opening and closing portions can also be freely defined.

In this way, it is possible to select freely the locations at which a container is to be taken up by another unit in the course of a rotation and the locations at which it is to be delivered to a further unit. In this way, the conveying devices 30 are capable of being used in a variable manner for widely varying plants. A drive motor (not shown in detail) is provided for each individual conveying device 30, in which case this drive motor and also a control means for the individual gripping clamps can be integrated into an overall control concept for the plant.

All the features disclosed in the application documents are claimed as being essential to the invention, insofar as they are novel either individually or in combination as compared with the prior art.

LIST OF REFERENCES 1 apparatus
2 shaping unit
4 filling unit
5 central control device
6 sterilization unit
8 furnace
9 microwave oven
10 pre-forms
11 further sterilization unit
20 containers
22 supply region
24 discharge region
25, 64 carrier wheel
30 conveying device
32 drive element
45 carrier wheel
46 conveying elements
42 supply region
44 discharge region
52, 54, 56, 58 communication connection
62 gripping clamp
64 carrier
66 connection point
68 housing
71 production unit
72 plastics material supply unit
74 fastening element
75, 85 buffer unit
76, 80 labelling unit
78 adjustment mechanism
81 coating unit
82 stand
83 metering unit
84 telescope-like element
86 base element
87 valve node
88 robot unit for mould change
91 injection unit 92 closure supply unit
93 closure unit
94 sterilization unit for container closures
R conveying direction
H height
A, B opening and closing positions for gripping clamps
R conveying direction of the container closures
Y pivot axis for gripping clamps 62

The invention claimed is:

1. A modular apparatus for the production of containers for liquid having a plurality of process units including a shaping unit for shaping plastics material pre-forms into plastics material containers, and a filling unit for tilling the plastics material containers with a liquid medium, wherein the filling unit is arranged downstream with respect to the shaping unit in a conveying direction (R) of the plastics material containers, wherein the shaping unit has a supply region for supplying the plastics material pre-forms as well as a discharge region for discharging formed plastics material containers out of the shaping unit, and wherein the tilling unit has a supply region for supplying the plastics material containers to the filling unit and a discharge region for discharging filled plastics material containers out of the filling unit, wherein at least one conveying device, which acts as an interface and which conveys the plastics material containers at least locally and in an individual manner between the shaping unit and the filling unit, is located between the discharge region of the shaping unit and the supply region of the filling unit, and wherein the conveying device comprises a self-contained conveying device, driven by a servo motor, and constructed such that at least one additional process unit for handling the plastics material containers may be inserted into the apparatus between the shaping unit and the filling unit, wherein the additional process unit is attached to the conveying device such that the flow of the plastics material containers between the shaping unit and the filling unit runs by way of the additional process unit, and wherein the conveying device is located between the shaping unit and the filling unit acts as an interface for the additional process unit.

2. The apparatus according to claim 1, wherein the apparatus has a plurality of conveying devices, wherein these conveying devices are designed in a substantially similar manner.

3. The apparatus according to claim 1, wherein the apparatus has a control device for controlling the shaping unit and the filling unit.

4. The apparatus according to claim 3, wherein the conveying device has a drive device as well as a control input which is connected to a control output of the control device in order to integrate the conveying device into the apparatus.

5. The apparatus according to claim 1, wherein the conveying device has a plurality of gripping elements arranged on a carrier rotatable about a pre-set axis of rotation (X) in order to grip the containers, wherein these gripping elements are controlled at least in part by a control device.

6. The apparatus according to claim 5, wherein the gripping elements are capable of being controlled in a manner dependent upon a rotational setting of the carrier with respect to the axis of rotation (X), wherein pre-set control positions (A, B) are capable of being freely selected with respect to the rotational setting of the carrier.

7. The apparatus according claim 1, wherein a conveying device is arranged in each case at the supply region and the discharge region of the shaping unit as well as at the supply region and the discharge region of the filling unit, wherein these conveying devices are designed in a similar manner in each case.

8. The apparatus according to claim 1, wherein at least one sterilization unit for sterilizing the containers using at least two preferably similar conveying devices is integrated between the shaping unit and the filling unit.

9. An apparatus according to claim 1, wherein the conveying device has a separate conveying path for conveying the containers.

10. The apparatus according to claim 1, wherein the conveying device is a conveying star wheel.

11. The apparatus according to claim 1, wherein the apparatus is capable of being assembled with any desired handling units for handling containers whilst using similar conveying devices.

12. The apparatus according to claim 1, wherein a labeling device for labeling plastics material containers is integrated into the apparatus.

13. The apparatus according to claim 1, wherein a conveying device for conveying the containers is arranged in at least one supply region or at least one discharge region.

14. A conveying device for an apparatus according to claim 1, having a plurality of gripping elements arranged on a carrier rotatable about a pre-set axis of rotation (X) in order to grip the containers, wherein these gripping elements are capable of being controlled at least in part, and with a drive device for rotating the carrier, wherein the gripping elements are capable of being controlled in a manner dependent upon a rotational setting of the carrier with respect to the axis of rotation (X), wherein pre-set control positions (A, B) are capable of being freely selected with respect to the rotational setting of the carrier.

15. A method of assembling an apparatus as claimed in claim 1 with the steps:
submission of a specific product requirement;
determination of the components necessary for this product requirement;
issue of information which is characteristic of the necessary components, wherein this information is ascertained on the basis of the product requirement.

16. A method according to claim 15, wherein the product requirement contains at least one parameter which is characteristic of a degree of purity in the interior of the containers to be produced.

17. The apparatus according to claim 1, wherein individual units of the conveying device may be decoupled from the apparatus.

18. The apparatus according to claim 1, wherein the conveying device has a plurality of gripping elements arranged on a carrier, wherein at least some of the gripping elements are actively controllable.

19. The apparatus according to claim 1, wherein tile conveying device has a plurality of gripping elements arranged on a carrier, which gripping elements are capable of being changed over from active control to passive control.

20. The apparatus according to claim 1, wherein the conveying device has a drive device of which is capable of being used under varying geometric conditions.

21. The apparatus according to claim 1, wherein the conveying device has a plurality of gripping elements arranged on a carrier wheel and displaceable in a radial direction with respect to the carrier wheel.

22. A modular apparatus for the production of containers for liquid having a plurality of process units including a shaping unit for shaping plastics material pre-forms into plastics material containers, and a filling unit for filling the plastics material containers with a liquid medium, wherein the filling unit is arranged downstream with respect to the shaping unit in a conveying direction (R) of the plastics material containers, wherein the shaping unit has a supply region for supplying the plastics material pre-forms as well as a discharge region for discharging formed plastics material containers out of the shaping unit, and wherein the filling unit has a supply region for supplying the plastics material containers to the filling unit and a discharge region for discharging filled plastics material containers out of the filling unit, wherein at least one conveying device, which acts as an interface and which conveys the plastics material containers at least locally and in an individual manner between the shaping unit and the filling unit, is located between the discharge region of the shaping unit and the supply region of the filling unit, and wherein the conveying device comprises a self-contained conveying device, driven by a servo motor, and constructed such that at least one additional process unit including a labeling device for handling the plastics material containers may be inserted into the apparatus between the shaping unit and the filling unit, wherein the additional process unit is attached to the conveying device such that the flow of the plastics material containers between the shaping unit and the filling unit runs by way of the additional process unit, and wherein the conveying device located between the shaping unit and the filling unit and acts as an interface for the additional process unit.

23. The modular apparatus according to claim 1, wherein the conveying device includes gripping clamps.

24. The modular apparatus according to claim 22, wherein the conveying device includes a gripping device.

\* \* \* \* \*